United States Patent [19]
Chang

[11] Patent Number: 5,132,583
[45] Date of Patent: Jul. 21, 1992

[54] PIEZORESISTIVE MATERIAL, ITS PREPARATION AND USE

[75] Inventor: Victor Chang, S. Antonio De Los Altos, Venezuela

[73] Assignee: Intevep, S.A., Caracas, Venezuela

[21] Appl. No.: 409,756

[22] Filed: Sep. 20, 1989

[51] Int. Cl.⁵ .......................................... H01L 41/113
[52] U.S. Cl. .................................... 310/339; 310/357; 310/358; 310/324; 252/62.9
[58] Field of Search ...................... 252/518, 62.9, 511, 252/506; 310/324, 339, 357, 358

[56] References Cited
U.S. PATENT DOCUMENTS
4,944,891  7/1990  Sagong et al. ..................... 252/62.9

*Primary Examiner*—William R. Dixon, Jr.
*Assistant Examiner*—Chris Gallo
*Attorney, Agent, or Firm*—Fleit, Jacobson, Cohn, Price, Holman & Stern

[57] ABSTRACT

Piezoresistive material, useful as a sensing agent for mechanical deformation undergone by pieces or structures when they support loads during their normal operation, consists essentially of a substantially homogeneous solid mixture of three or more components, including a piezoresistive element, a conducting element and a binding element. Said piezoresistive material is also useful for manufacturing various transducers, the function of which is based on elastic deformation.

22 Claims, 7 Drawing Sheets

PIEZORESISTIVE MATERIAL, ITS PREPARATION AND USE

FIELD OF THE INVENTION

Piezoresistive material useful as a sensing agent for mechanical deformation, a method of preparing such material and manufacturing various sensors from said material.

BACKGROUND

Optical gauges provide one of several techniques for measuring mechanical deformation. Their use is based on interference; they are precise but permit measuring only a reduced area of a piece and are difficult to apply in the field. The photoelasticity technique, which uses the principle of light diffraction, allows a gradient display (since it collects data on a larger surface) but it is of a qualitative type and cannot be easily adapted to automatic acquisition of data. The so-called piezoresistive deformation indicators or strain gauges are very well accepted in the market and provide accurate data promptly, but are difficult to manufacture and to apply. This is confirmed, e.g., by U.S. Pat. No. 3,626,256 which refers to a deformation-measuring device using (as an electrically-insulating material) a commercial resin which is highly resistant to heat; in order to deposit a layer of semiconducting material and to maintain it at high temperatures, it is necessary to use vacuum deposition or cathode sputtering in an argon atmosphere, both methods being well known in the art and, besides, complex and expensive. In European patent application EP-61404-A a stable resistive ink (cermet) is used for the same purpose. Said ink is printed directly on ceramic or insulating glass through a silk-screen printing method. The involved process has a disadvantage of requiring high temperatures.

Another method is that of GB patent 2141548-A wherein coal particles (as an electric conducting material) are dispersed throughout a polymer (as a cementing agent) and with the addition of conducting terminals. This method, however, requires anodizing a surface to which a layer of the prepared material is applied.

SUMMARY OF THE INVENTION

Piezoresistive material is provided in a final useful form as a solid admixture of:
a) a piezoresistive component,
b) a conducting component and
c) a binding component.

The preparation and uses of this material are reflected in a number of distinct aspects:
1) the piezoresistive material,
2) precursors of (1) in the form of a substantially homogenous powder and of a paste prepared from such powder,
3) a deformable substrate coated with (1) and wherein electrical contacts are situated between the substrate and the piezoresistive material,
4) a deformable substrate (3) having a non-conducting surface,
5) a deformable substrate (3) having an electrically-conducting surface on which is situated an electrically-insulating coating to which the electrical contacts are fixed,
6) a deformable substrate (3) having an electrically-conducting surface which is anodized prior to fixing the electrical contacts thereto,
7) a combination [(4), (5) or (6)] which has a protective coating on (1),
8) a method of preparing (1),
9) methods of using (1) to measure elastic deformation, and
10) transducers comprising (1).

The principal object of the present invention is to provide piezoresistive material useful to indicate mechanical deformation, easy to prepare, economical, accurate, capable of yielding reproducible data, versatile with regard to its mode of application and, besides, much more sensitive than previously-available counterparts since the gauge factor is one or two orders of magnitude higher than that of currently marketed metallic gauges.

Another object of the present invention is to provide a piezo-resistive material that makes quantitative measurement of non-uniform deformation states possible. In places where there is a spacial variation or gradient, particularly one which is almost continuous, the invention provides a more direct and simple means of measuring than a strain gauge or a discrete deformation gauge.

Another object of the present invention is to provide a piezo-resistive material that makes measurement of elastic deformation possible in two or three dimensions and, even more, leads to the feasibility of manufacturing duplicates of mechanical pieces. The internal deformation state of a piece is ascertained simply by placing electrodes internally according to an appropriate pattern, thus studying the piece in its volume.

The present invention also provides for manufacturing various types of transducers or sensors based on the principle of piezo-resistivity.

Another characteristic of this invention is its easy adaptation to automation of data acquisition.

DETAILS

The piezoresistive material of the present invention consists essentially of a solid mixture including three components distributed at random (oriented or not). The material is advantageously substantially homogeneous and comprises:

a) Component 1 (FIG. 1) consists essentially of piezoresistive microcrystals varying in size from 0.1 to 50 $\mu m$. This crystalline material is a semiconductor selected from a large group of compounds comprising, inter alia, metallic oxides, such as cuprous oxide and zinc oxide, quartz, barium titanate, copper sulfide, cadmium sulfide, silicon, germanium and other semiconductors. This component is optionally oriented by a magnetic or an electric field.

Figure 1:
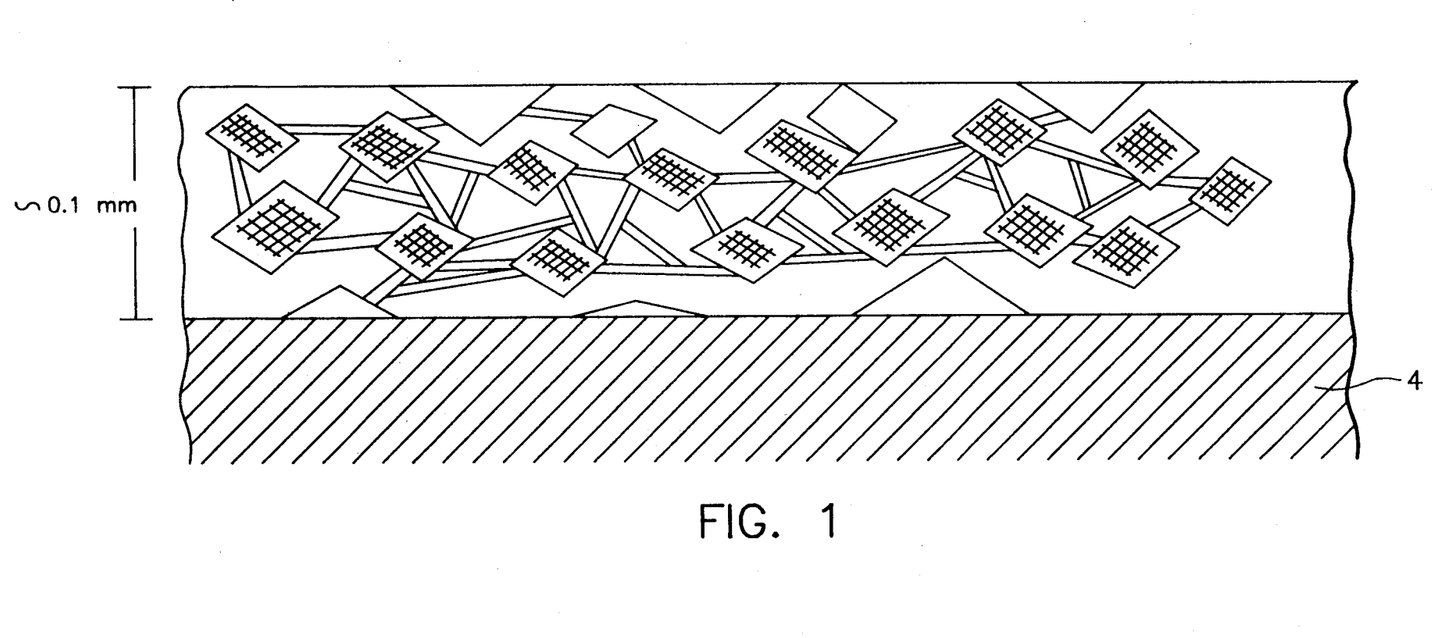
FIG. 1 is a cross section of the piezoresistive material.

This component is present in the mixture in an amount of from 30 to 70, preferably from 40 to 60, percent by weight with respect to the total. The electrical resistance of the microcrystals varies in direct proportion to mechanical deformation when they undergo stress, as seen experimentally.

b) Component 2 (FIG. 1) is a powder consisting essentially of one or more conducting elements, e.g. those selected from the group comprising graphite and metals, such as antimony, aluminum, copper, iron, silver, and zinc. Said component is present in the mixture in an amount of from 5 to 60, preferably from 10 to 50, percent by weight with respect to the total.

c) Component 3 (FIG. 1) is a powder, liquid or paste binding mass which acts as a structural base or cement for the other two components and also as a fixer to substrate 4 (FIG. 1). It advantageously comprises binder which is ceramic or polymeric in nature. This component is present in the mixture in an amount of from 10 to 60, preferably from 20 to 55, percent by weight with respect to the total. The binder is, e.g., selected from a group of resins comprising epoxy, acrylic, phenolic, and polyester resins, or from a ceramic group, such as glasses, metallic oxides, gypsum, commercial glue of a ceramic nature, and terra cotta. Neither time and curing temperature nor layer thickness is critical, but appropriate ranges of such parameters are selected for best results.

The mixture is prepared in the form of a paste or slurry, the viscosity of which is adjusted by adding appropriate solvent (according to the binder used). When liquid resin is used, the viscosity of the final mixture is adjusted by means of a solvent, such as acetone. When ceramic powder is used as a cementing or supporting component, it is mixed with the other elements, and a non-aqueous element, for example kerosene, is added until a creamy consistency is reached. In this last case when the mixture is applied to a surface under study, it is cured or fired by heating in a furnace or by applying local heat. The temperature used is approximately 600° C., generally in a range of from 575 to 625° C.

Application of the material depends upon the nature of the surface to which it is applied. Optional modes of application include brushing, spraying and silk-screen printing. Uniformity of an applied layer's thickness is not critical and is adjusted up to approximately 0.1 mm by applying the paste on a surface under study. When the paste is applied on a surface of nonconducting substrate, a network of contacts, e.g. varnished wires or cables, that are fixed to the substrate by means of a commercial glue, for example cyanoacrylate, must first be set up. Each wire end is then stripped (uncoated) in order to ensure an effective contact with the piezoresistive material. Each neighboring pair of contacts, when fixed to the surface under study, is a measuring element. Finally, the mixture is applied in any suitable conventional way.

Figure 2:
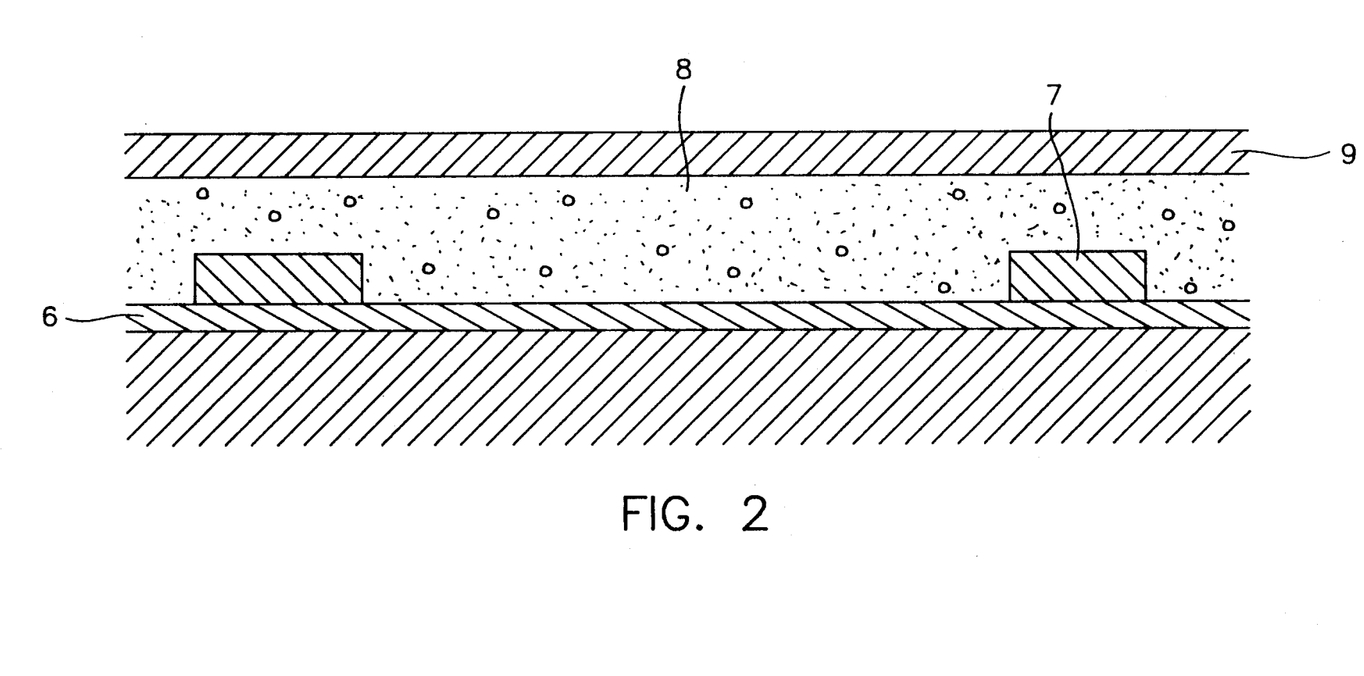
FIG. 2 is a cross section of a substrate coated with the piezo-resistive material ready to measure mechanical deformations.

When the paste is applied on a conducting surface (see FIG. 2), substrate 5 is coated with a thin layer of insulating ceramic or varnish 6 or, if preferred, the surface of substrate 5 is initially anodized. An electrical contact network 7 is set up after the insulating ceramic is applied, the varnish is air-dried or the surface is anodized, and then the piezoresistive material 8 is applied. Thereafter, the piezoresistive material is coated, for protection, with another thin layer 9 of varnish or other protective material.

EXAMPLE 1

Figure 3:
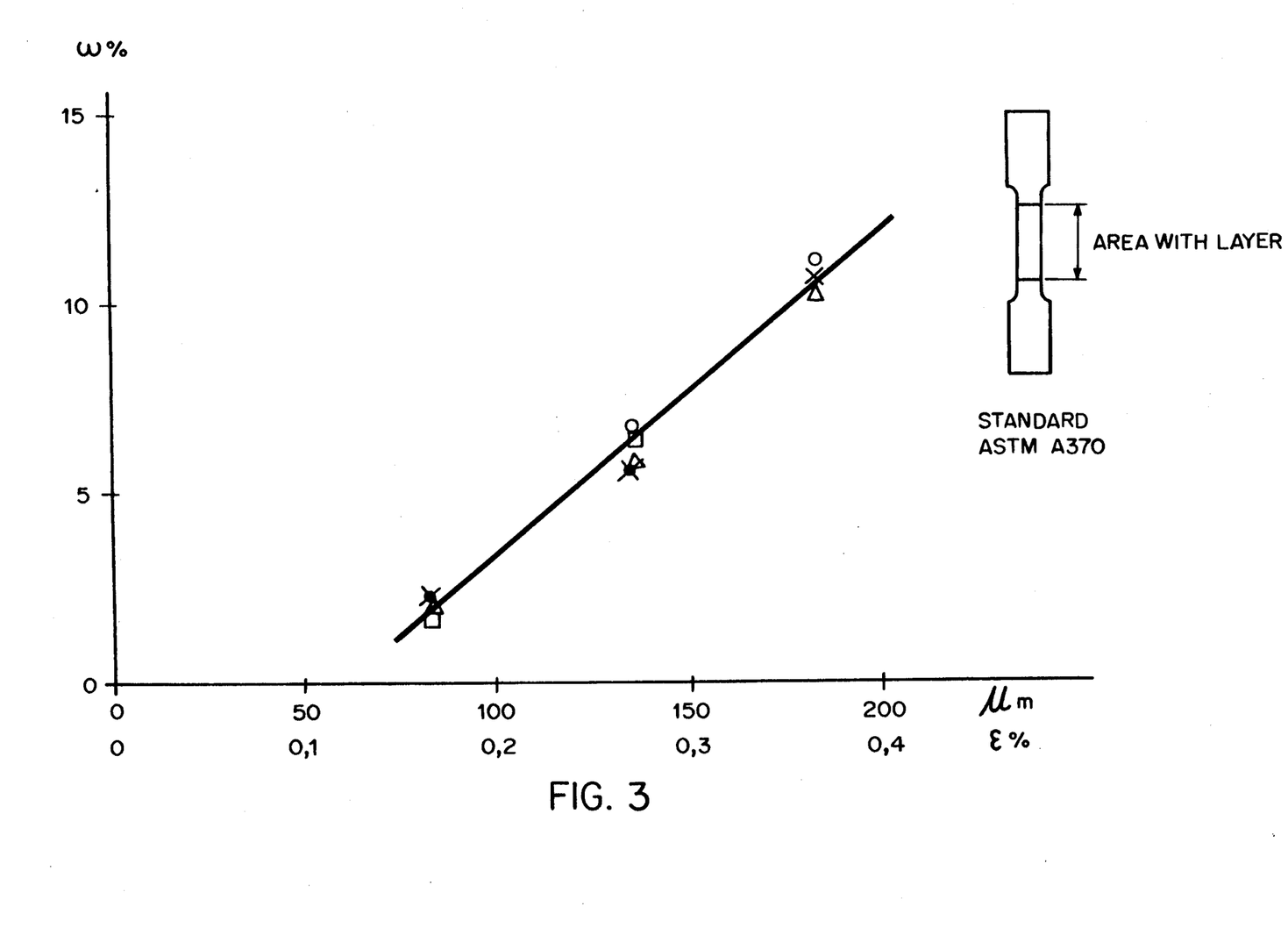
FIG. 3 is a graph of data from a traction test with plexiglas standard test pieces coated with piezoresistive material.
Figure 4:
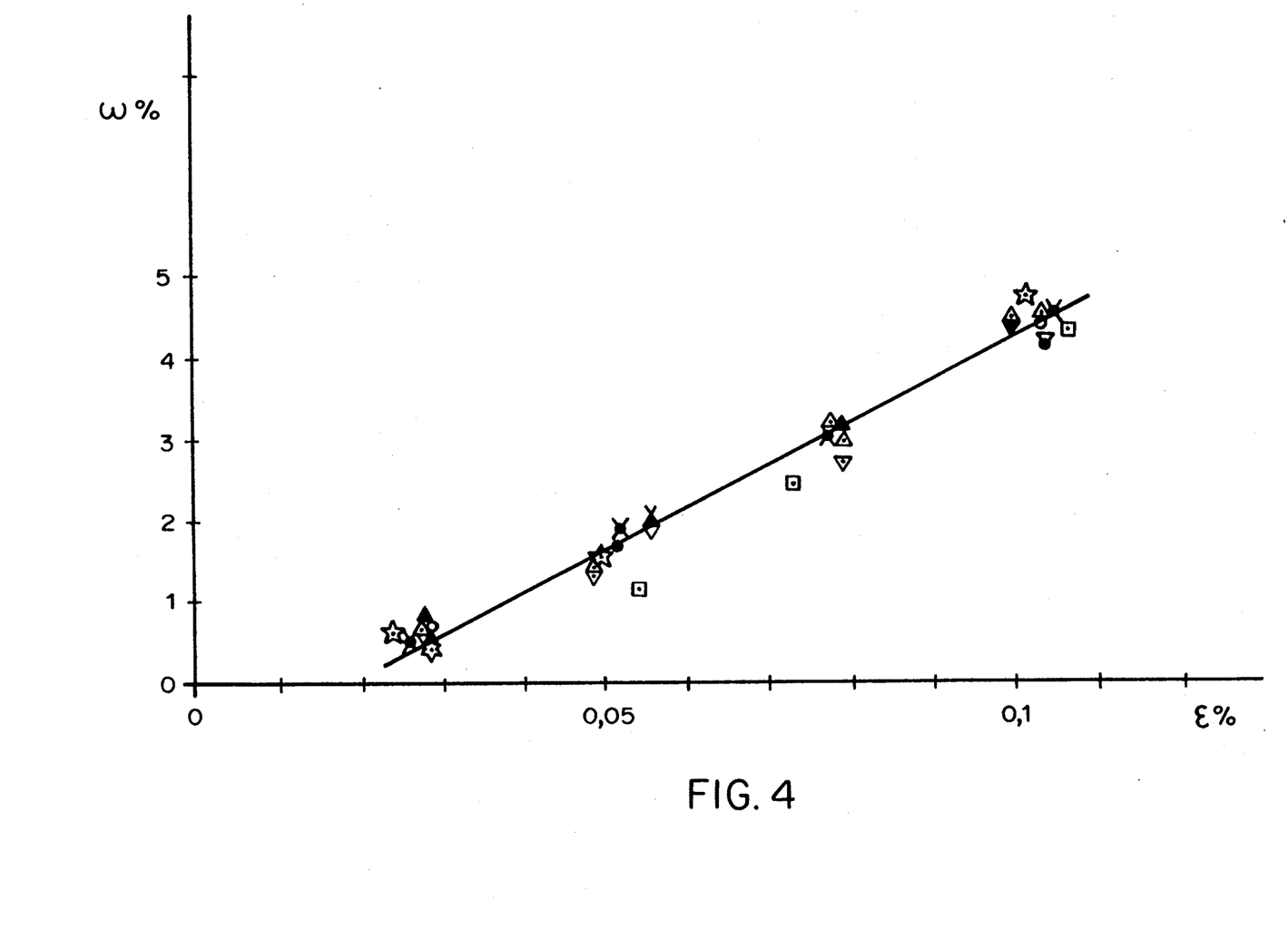
FIG. 4 is a graph of data from a traction test with 1020 steel standard test pieces coated with piezoresistive material.

13 percent by weight of powdered graphite having a particle diameter less than 50 $\mu$m and 33 percent by weight of powdered antimony (having a particle diameter of less than 50 $\mu$m) are mixed with 53 percent by weight of powdered epoxy resin until a homogeneous mixture is obtained. (The specific nature of the epoxy resin is not critical; virtually any commercially-available epoxy resin, e.g., HBM-x-60 or HBM-EP250, is suitable). The resin's liquid component is added until a creamy consistency is reached. The resulting paste is applied on standard dumbbell test pieces or test probes, once on plexiglas test pieces and once on 1020 steel test pieces, in order to measure the percent variation of electrical resistance or resistivity $\omega$ as a function of the percent deformation e of the surface on which mechanical stress is exerted (FIGS. 3 and 4). The variation in electrical resistance is measured with a conventional voltmeter, preferably one having an accuracy of 0.1%.

In both graphs each symbol (circles, squares, etc.) represents the same pair of electrical contacts or wires connected to the sample. As can be seen from both tests, a straight line is obtained for deformations greater than 0.15% for plexiglas and 0.025 for steel probes; the slope of each line represents the gauge factor, which is 42.5 w/e for plexiglas and 51.4 w/e for steel.

EXAMPLE 2

Figure 5:
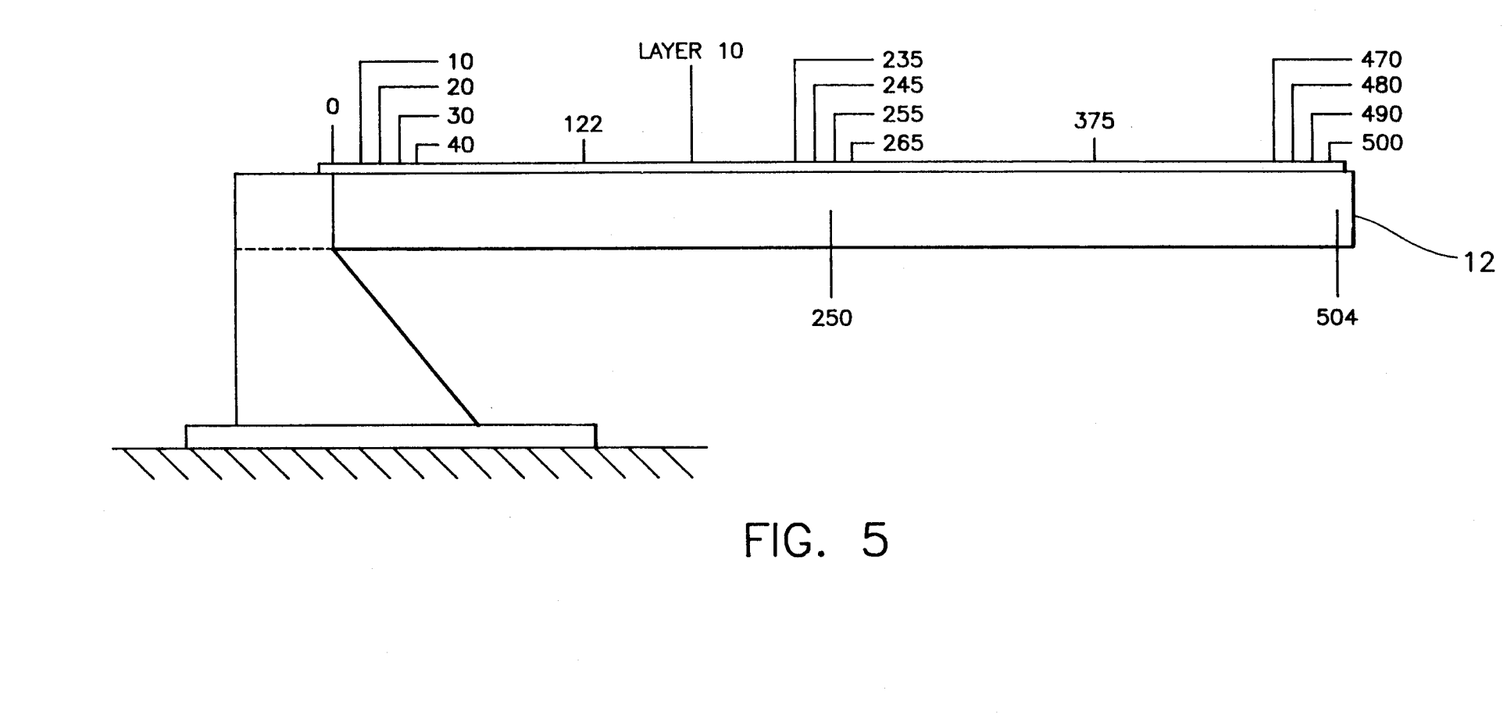
FIG. 5 is a cross section of a plexiglas cantilever beam with a layer of piezoresistive material.

Following the same procedure illustrated in Example 1, a mixture is prepared having these weight ratios: graphite 30 percent, silicon 40 percent and epoxy resin 30 percent (see FIG. 5). This preparation (layer 10) is applied on the surface of a cantilever beam of hollow plexiglas 12, rectangular in shape and measuring: 0.510 m $\times$ 0.050 m $\times$ 0.025 m, with a 3 mm thick wall. The paste is applied using two strips of adhesive tape as a guide for thickness and a rubber spatula as an applicator. Electrodes consisting of 0.1 mm diameter copper wires had previously been placed on the plexiglas beam surface. In the same FIG. 5, the figures given are the coordinates in mm (from the secured end of the beam) at which the electrodes are placed. Coordinate 504 indicates the point where the load is placed.

Figure 6:
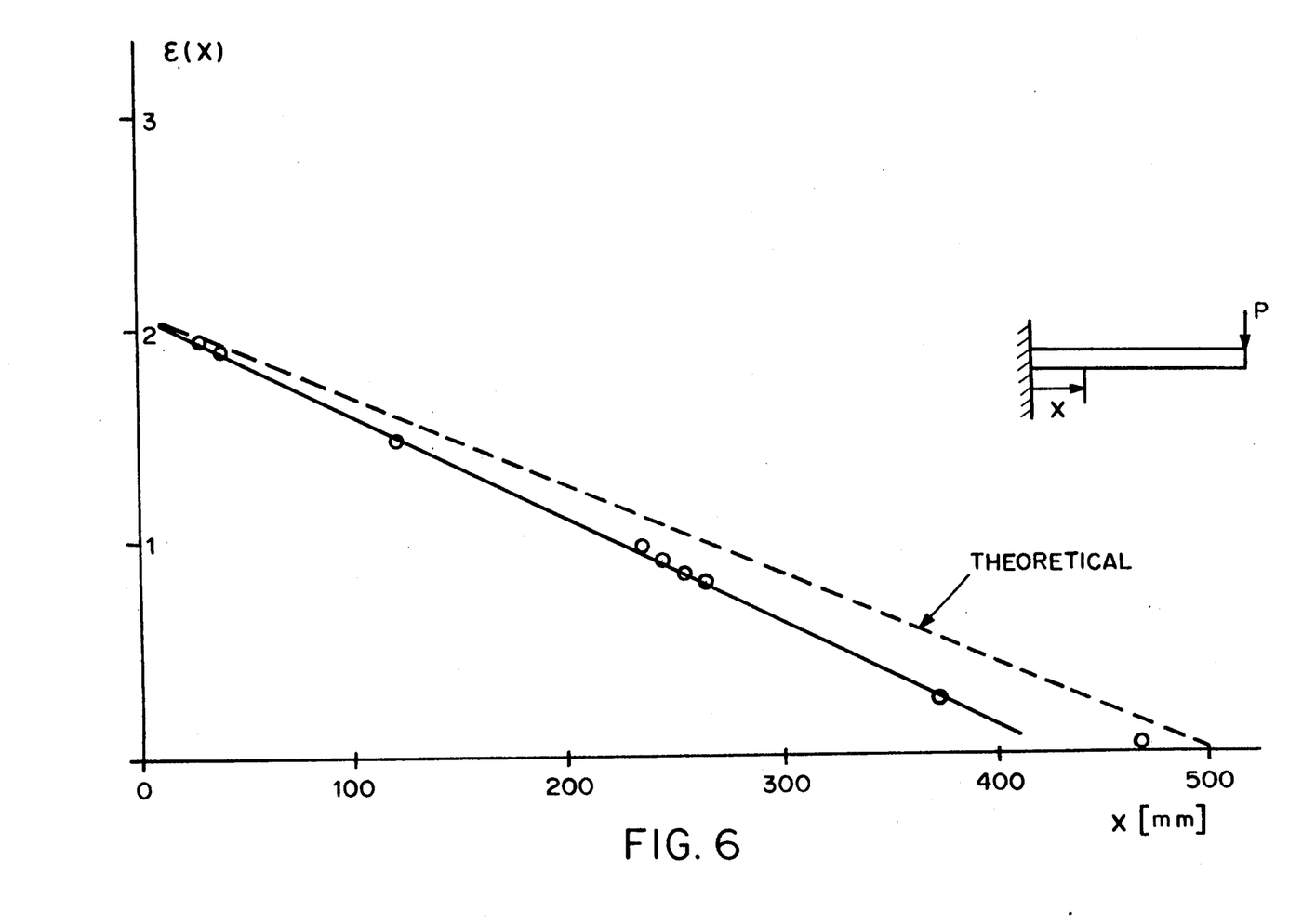
FIG. 6 is a graph of deformation in a plexiglas cantilever beam coated with piezoresistive material.

In FIG. 6, the unit deformation (x) is shown as a function of the length x given between a point of the beam selected for measurement and another point of same, taken as reference (the anchorage point). The experimental results of this test show that it is feasible to make measurements of elastic deformation in cases where such deformation is not uniform but, rather, a gradient exists. This represents a considerable advantage obtained with the piezoresistive material of the invention.

To obtain the deformation signals of the piece or structure under study, the following mathematical ratio is used:

$$\epsilon = \left(\frac{\omega}{K_1}\right)^{\frac{1}{(K_2+1)}}$$

where ε is the length variation undergone by said piece with respect to its initial length (elastic deformation) and, therefore, it is also given by the expression:

$$\epsilon = \frac{\Delta L}{Lo}$$

ω is the change of electrical resistance measured between the electrodes of the piezoresistive material with respect to the original electrical resistance existing between themselves. ω is given through the expression:

$$\omega = (Rd - Ro)/Ro = K_1^{(K+1)}$$

where:
Rd = electrical resistance of the pair (RE) when the piece is deformed
Ro = RE when the piece is not deformed.
$K_1$ and $K_2$ are experimental constants typical of the material.

Thus, by measuring the relative change in the electrical resistance of the piezoresistive material, the deformation undergone by the substrate is obtained.

Figure 7:
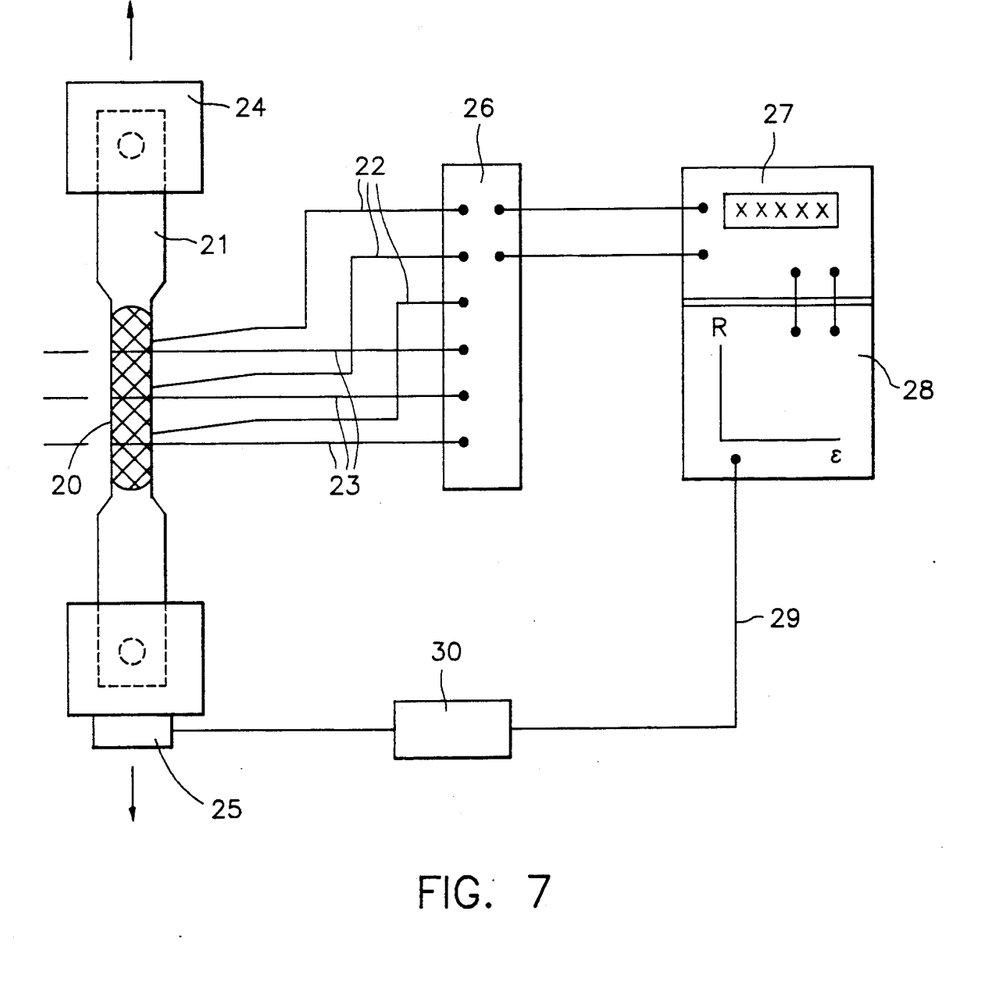
FIG. 7 shows a plexiglas standard test probe coated with the piezoresistive material.

In FIG. 7, a standard test probe 21 is coated with a pieozoresistive layer 20. Rear connecting leads 22 and front connecting leads 23 connect the layer to an adjustable multiplexer 26. The test probe is secured by testing machine grids 24 for traction assays, and deformation rate is suitably adjusted. Changes in resistance are measured by an ohmmeter 27 (which has precision to 4.5 digits) via the multiplier 26. The function of the multiplexing unit is to connect each separate pair of leads to the ohmmeter 27 at preadjusted time intervals.

A signal from ohmmeter 27 is transmitted to an XY recorder 28 on the Y axis. A signal from a displacement sensor electronic signal processing unit 30 is transmitted to the X axis of the recorder. The signal processing unit 30 is also connected to a displacement sensor 25 of the testing machine (not shown). This makes it possible to obtain Resistance vs. Deformation Curves, from which curves of ω vs. ε are obtained.

The invention and its advantages are readily understood from the foregoing description. Various apparent changes can be made in the piezoresistive material, its components and composition, its physical state and condition, its uses, its preparation, its combination with other components and transducers comprising same, without departing from the spirit and scope of the invention or sacrificing its material advantages. The processes, compositions, products and articles hereinbefore described are merely illustrative of preferred embodiments of the invention.

What is claimed is:

1. A piezoresistive material suitable for a sensing agent for mechanical deformation occurring in conducting or non-conducting pieces or structures characterized by having a) a crystalline piezoresistive semiconducting component, b) a conducting component and c) a cementing and fixing component in ratios of 30 to 70 percent by weight for (a), 5 to 60 percent by weight for (b) and 10 to 60 percent by weight for (c) with respect to the total mixture.

2. A piezoresistive material according to claim 1 wherein component (a) is a member selected from the group consisting of silicon, germanium, quartz, metallic oxide and metallic sulfide.

3. A piezoresistive material according to claim 1 wherein component (b) is a member selected from the group consisting of graphite, iron, copper, zinc, aluminum and other common metal conducting component means.

4. A piezoresistive material according to claim 1 wherein component (c) is a resin or a ceramic.

5. A piezoresistive material according to claim 2 wherein component (a) is optionally oriented by a magnetic or an electrical field.

6. A method of preparing a piezoresistive material useful as a sensing agent for mechanical deformations occurring in conducting or non-conducting pieces or structures, which comprises mixing a) a crystalline piezoresistive semiconducting component, b) a conducting component and c) a cementing and fixing component in ratios of 30 to 70 percent by weight for (a), 5 to 60 percent by weight for (b) and 10 to 40 percent by weight for (c) with respect to the total mixture.

7. In a method of manufacturing a transducer, which functions according to a mechanical deformation principle, from piezoresistive material, the improvement wherein the piezoresistive material is piezoresistive material as defined in claim 1.

8. A method of manufacturing a transducer according to claim 7 wherein the resulting transducer is capable of providing gradient data when the mechanical deformation is not uniform.

9. A method of manufacturing a transducer according to claim 7 wherein the resulting transducer is capable of providing elastic deformation data on a plane, in two dimensions.

10. A method of manufacturing a transducer according to claim 7 wherein the resulting transducer makes it possible to obtain deformation on the volume, in three dimensions.

11. A composition suitable for use in sensing mechanical deformation and consisting essentially of a substantially uniform admixture of
a) from 30 to 70 percent by weight of a piezoresistive semiconductive component,
b) from 5 to 60 percent by weight of an electrically-conducting component, and
c) from 10 to 60 percent by weight of a binding component.

12. A composition according to claim 11 wherein the admixture is in powder form prior to curing or firing.

13. A composition according to claim 11 wherein the admixture is in liquid, paste or slurry form prior to curing or firing.

14. A composition according to claim 11 wherein the admixture is in solid form.

15. A substrate subject to mechanical deformation, a surface of which is coated with a composition according to claim 14 and wherein at least one pair of electrical contacts is situated between the surface and the composition.

16. A substrate according to claim 15 wherein the surface is a non-conducting surface, the electrical contacts are fixed to the surface, and the composition is coated with a protective layer.

17. A substrate according to claim 15 wherein the surface is an electrically-conducting surface which is coated with an electrically-insulating coating to which the electrical contacts are fixed, and the composition is further coated with a protective layer.

18. A substrate according to claim 15 wherein the surface is an electrically-conducting surface which is anodized, the electrical contacts are fixed to the anodized surface, and the composition is further coated with a protective layer.

19. A transducer comprising piezoresistive material and wherein the piezoresistive material comprises a composition according to claim 14.

20. A transducer comprising piezoresistive material and wherein the piezoresistive material is that of claim 1.

21. A piezoresistive material according to claim 4 wherein the resin is an epoxy resin, an acrylic resin, a phenolic resin or a polyester resin, and the ceramic is a glass, gypsum, terra cotta or commercial glue.

22. A piezoresistive material according to claim 1 wherein component (a) consists essentially of piezoresistive microcrystals varying in size from 0.1 to 50 microns.

* * * * *

UNITED STATES PATENT AND TRADEMARK OFFICE
CERTIFICATE OF CORRECTION

PATENT NO. : 5,132,583
DATED : July 21, 1992
INVENTOR(S) : Victor CHANG

It is certified that error appears in the above-identified patent and that said Letters Patent is hereby corrected as shown below:

Column 4, line 21, "deformation e" should read --deformation $\epsilon$--; line 32, "w/e" (each occurrence) should read --$\omega/\epsilon$--; line 65, in the formula, "K2" should read --$K_2$--. Column 5, line 13, in the formula, "$K_1$" should read --$K_1\epsilon$--, and "(K+1)" should read --$(K_2+1)$--.

Signed and Sealed this

Fifth Day of October, 1993

*Attest:*

BRUCE LEHMAN

*Attesting Officer*    Commissioner of Patents and Trademarks